June 10, 1969 J. D. RAMSAY 3,448,778
LEVEL CONTROL SYSTEM
Filed Dec. 7, 1965

INVENTOR:
JOSEPH D. RAMSAY
BY Howson & Howson
ATTYS.

June 10, 1969

J. D. RAMSAY 3,448,778

LEVEL CONTROL SYSTEM

Filed Dec. 7, 1965

INVENTOR:
JOSEPH D. RAMSAY
BY Howson & Howson
ATTYS.

FIG. 5a

United States Patent Office 3,448,778
Patented June 10, 1969

3,448,778
LEVEL CONTROL SYSTEM
Joseph D. Ramsay, Audubon, N.J., assignor to Campbell Soup Company, Camden, N.J., a corporation of New Jersey
Filed Dec. 7, 1965, Ser. No. 512,182
Int. Cl. B65b 1/30, 3/26, 43/42
U.S. Cl. 141—83  4 Claims

ABSTRACT OF THE DISCLOSURE

An apparatus for automatically maintaining substantially constant the level of product in a series of rapidly-moving open-ended cans, which employs a capacity sensor positioned above the path of the cans to produce signals indicative of the spacing from the sensor to the objects passing beneath it, an electronic sampler actuated by a proximity detector adjacent the path of the cans to select samples of the capacity sensor signal which are indicative of the level of the product in the can, an integrating memory circuit arrangement supplied with the sampled level-indicating signals for producing a control signal representative of an average level of product in a plurality of successive cans, and a servo motor arrangement responsive to the control signals for correcting the extent of filling of subsequent cans. A potentiometer follower and a tachometer generator, both operated by the servo motor, provide negative feedback signals which are combined with the control signal from the memory circuit to stabilize the system operation. The capacity sensor, proximity sensor and sampler enable the supply of accurate level-indicating signal samples to the memory unit despite very rapid motion of the can, and the particular form of negative feedback utilized enables the use of sufficiently high gains in the system to effect rapid correction while preventing excessive hunting or oscillation in the system.

---

This invention relates to systems for automatically controlling the level of material in containers, and particularly to such systems for controlling the headspace in open-ended product-filled cans.

There are a variety of applications in which it is desirable to control accurately and automatically the extent of filling of containers by a material as the containers move along a conveyor. For example, in filling metal cans with food products such as soup or other liquid or semi-liquid foods, it is important to control accurately the headspace in the cans, where the headspace is the height of the unfilled space between the top level of the product in the can and the can cover. More particularly, in such cases it is important to fill the cans sufficiently to provide the advertised weight of product, but in many cases it is also important to leave a remaining unfilled space at the top of the can to facilitate circulation of the product during sterilization procedures usually performed after the cover has been applied. For commercial purposes it is also usually necessary to assure proper headspace despite the fact that the cans must be filled and handled automatically at a high rate, e.g. 300 cans per minute from a single production line.

One method which has been employed to assure release for sale only of cans having the proper headspace is to measure the headspace in the cans after filling as they travel along a conveyor and to divert the conveyor those which have a headspace outside of the allowable tolerances. However, this does nothing to improve the accuracy or uniformity of headspace originally produced in the cans, but merely prevents placing on the market improperly sterilized or improperly filled cans; the rejected cans represent inefficiency or waste in the canning process.

In another known method, gamma rays are directed across the path of a train of filled moving cans, in some cases with the covers already applied, and a detector on the opposite side of the cans is used to detect the strength of the gamma rays passing through the cans, the vertical position of the source of gamma rays being such that the rays pass through the intended headspace region. If the cans are too full the strength of the received gamma rays decreases below a predetermined level, while if the cans are underfilled the strength of the received gamma rays rises above the predetermined level. The level of the detected gamma rays is then utilized to control the extent of filling of subsequent cans. While such systems have been found to provide a degree of automatic control of headspace, they have been found to be less than optimum in a number of respects, including the production of excessive hunting (i.e. variation back and fourth around the desired headspace value), and inaccuracy due to a number of factors including the effects of the extremely strong signals received by the detector in the intervals between successive cans. Other drawbacks have also been found when attempting to operate with this prior-art type of system.

Accordingly it is an object of the invention to provide a new and useful system for controlling the level of material in containers.

Another object is to provide a system of the above-indicated type which operates with high accuracy.

Another object is to provide such a system which operates with a minimum of hunting.

A further object is to provide such a system which responds to continuing substantial trends in departures of the headspace in product-filled cans from a predetermined desired value, without responding substantially to minor differences in the headspace of immediately-successive cans or small groups of cans.

Another object is to provide such a system in which the amount of headspace produced by automatic control can readily be adjusted manually to any desired value.

Another object is to provide such a system which is relatively insensitive to the effects of occasional containers of grossly improper headspace.

Still another object is to provide such a system which is substantially unaffected by the nature of the cans or by the space between them, and which is capable of operation at high speed and hence applicable to control of headspace in cans moving rapidly along a conveyor.

In accordance with the invention, the above objects are achieved by a headspace control system which comprises a level sensor disposed adjacent and above the path of a train of moving containers so as to produce signals indicative of the height or level of objects in the train, and means responsive to the attainment of a predetermined position by each of the containers to sample the output signal of the level sensor only at times when it is accurately responding to the level of the material in the container, and not at times when either the container or the space between the containers is materially affecting the level sensor. The resultant sampled level-indicating signals therefore accurately represent the levels of the material in the successive containers. Each such sampled signal is supplied to an integrating memory device so constructed that its output at any time depends on the cumulative average effect of a substantial number of preceding sampled signals (e.g. 20) and is not determined by the most recent sampled signal alone. In this way the output signal of the memory device is made to respond to continued repetitive errors or trends in the headspace, but to be substantially nonresponsive to minor variations in headspace occurring between immediately-successive containers or in small groups of successive containers. The output of the memory device is then applied to control the filling of the containers in a manner to counteract any long-term consistent tendency for the headspace to exhibit substantial departures from the desired value. At the same time minor random variations in the headspace in successive containers are prevented from producing unnecessary and inappropriate changes in the filling of later containers.

Accordingly, due to the sampling action the sampled signals represent accurately the headspace in the individual cans, and, due to the integrating and memory function incorporated in the system, minor errors in headspace between immediately-successive cans or small groups of cans are effectively ignored while long-term errors are corrected.

These and other objects and features of the invention will be more fully comprehended from a consideration of the following detailed description of a specific embodiment of the invention, taken together with the accompanying figures in which.

Figure 1:
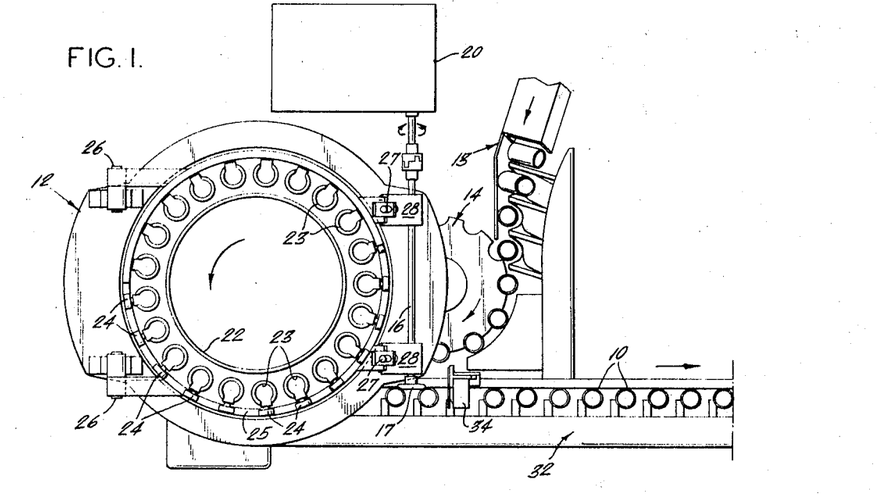
FIGURE 1 is a plan view of a can-filling system to which the invention is applied.
Figure 2:
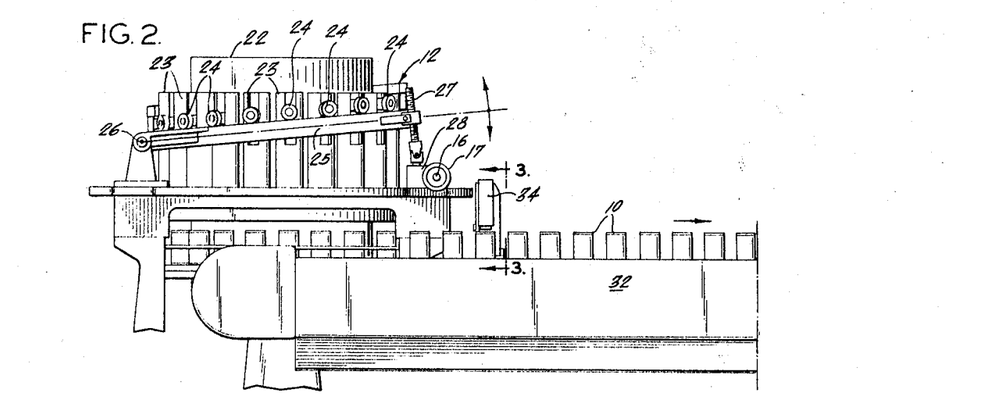
FIGURE 2 is an elevational view of the system of FIGURE 1.

Referring now to the system illustrated in FIGURES 1 and 2, there is shown therein a plan view of a typical installation of the novel headspace controller as it may be used in a typical application to maintain a substantially fixed headspace in soup-filled cans such as 10. These figures show a can-filler arrangement 12 which is supplied with a train of cans from a supply conveyor 13 by means of a feeder mechanism 14, the train of cans entering the can-filler arrangement and being moved around it in a counterclockwise direction as they are filled. It will be understood that the usual motor (not shown) is used to operate the can conveyor, feeder, filler, etc. The extent to which the cans are filled is determined by the rotational position of a fill-level control shaft 16, which in certain prior art systems is only adjustable manually, as by handle 17, but in the arrangement of the invention is also controlled automatically by a servo motor in the motor box 20. The mechanism of this filling arrangement may be conventional and may utilize a filler bowl or reservoir 22 having separate volumetric filling cylinders such as 23 which rotate around with the cans, one above each can, so that each can is continuously filled by emptying into it of one of the cylinders 23 as it moves around the upper half of the circle of rotation in FIGURE 1. The extent of filling of each can is determined by the amount of soup in its corresponding cylinder, and the latter amount is determined in turn by the maximum height reached by the cylinder fill control cam wheels such as 24 as they move upward along the cam ring 25 while rotating through the lower half of the circle of rotation in FIGURE 1. Accordingly the extent of filling of the cans is controlled by the height of the right-hand side of cam ring 25 in FIGURE 2, which can be varied by pivoting the cam ring about axis 26 in response to rotation of screw 27 by fill control shaft 16 through gear box 28. Thus rotation of fill control shaft 16 in one direction raises the cam ring to fill the cans more, the opposite direction of rotation then producing less filling of the cans.

After leaving the filler 12 the cans are moved in succession and in a straight line along the conveyor 32 past the headspace measuring unit 34 positioned adjacent the path of the cans near their exit from the filler, after which the cans pass along the conveyor to the next production stage which may, for example, by a can closer (not shown) which applies tops to the cans. The cans may move at relatively high speeds, for example so that 300 cans per minute pass each point on the conveyor, and the spacing between successive cans is not necessarily uniform.

Figures 3, 3A:
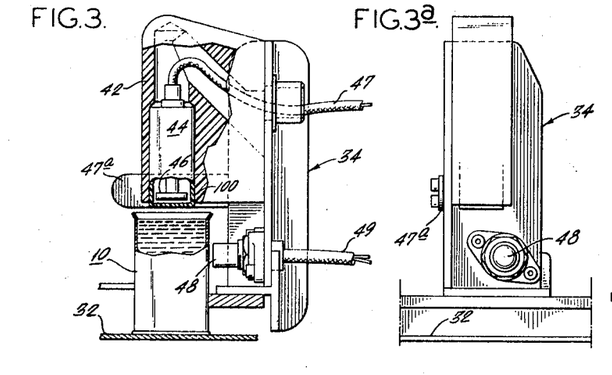
FIGURE 3 is a side view, enlarged and partly in section, of a portion of the system of FIGURE 2, taken along lines 3—3 including certain sensing elements of the invention.
FIGURE 3A is a front view of the apparatus of FIGURE 3.
Figures 4, 6A, 6B, 6C, 6D, 7A, 7B, 7C:
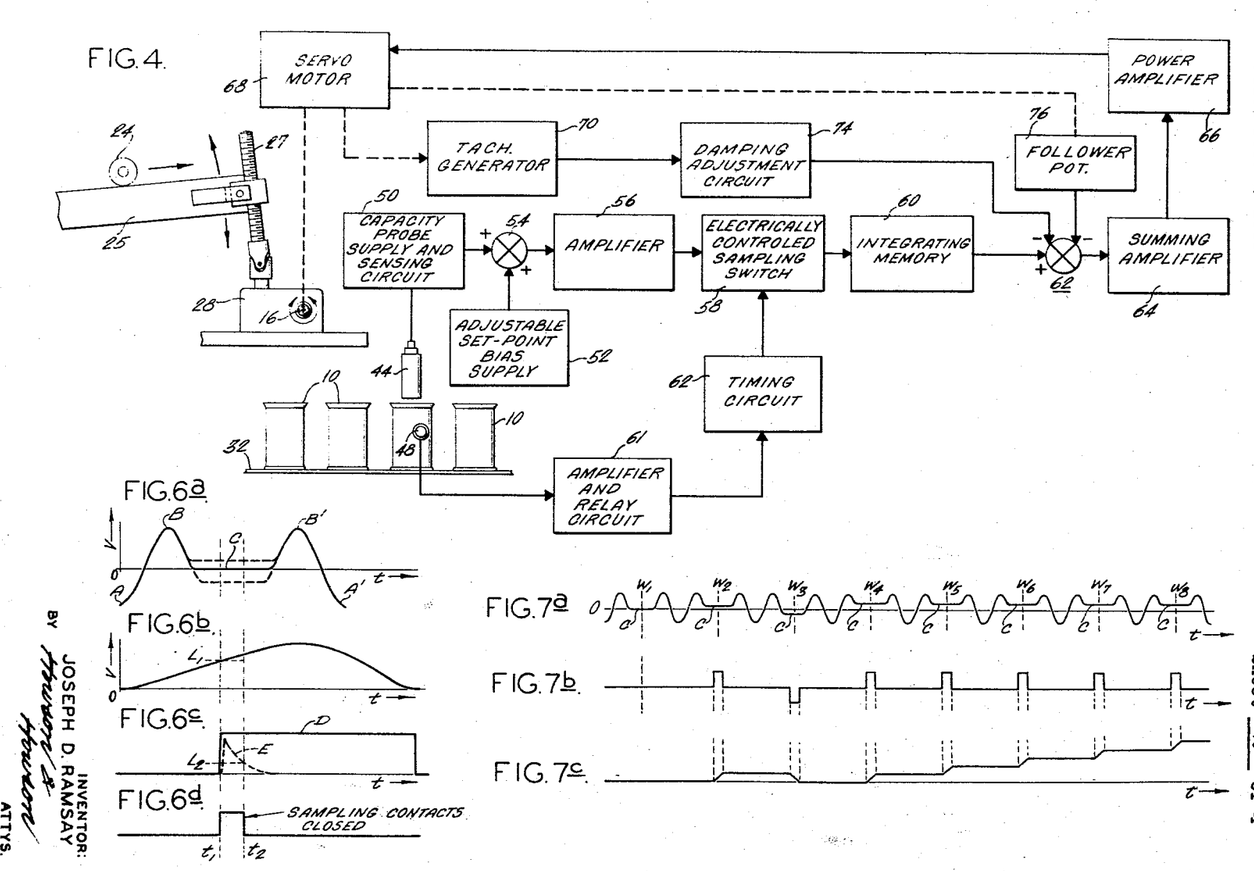
FIGURE 4 is a functional block diagram illustrating one preferred form of the invention.
FIGURES 6A, 6B, 6C and 6D are graphical illustrations showing the general form of various signals produced in a representative embodiment of the invention.
FIGURES 7A, 7B and 7C are further graphical representations showing waveforms of signals occurring in the illustrative embodiment of the invention.

FIGURES 3 and 4 show the headspace measuring unit 34 in more detail. These figures show a typical can 10 nearly filled with soup moving on the conveyor 32 after exit from the filler 12 and prior to reaching the can closer. It will be understood that the conveyor may include suitable guide rails for maintaining each can in the train at the same fixed lateral position sideways of the conveyor and for minimizing sideways vibratory motion of the can. Mounted above the path of the cans by means of a support frame 42 is a level-sensing capacity probe unit 44, the capacity probe 46 of which is positioned laterally over the center of the path of the top open ends of the train of cans, preferably just above the height of the top edges of the cans, which in any given run are usually of the same height. The capacity probe unit 44 preferably has a moisture-impervious enclosure so as to be protected from the warm fumes ordinarily rising from the soup, and is preferably of the type in which a disc-shaped metal probe 46 is disposed parallel to the top surface of the soup and supplied by way of an electrical cable 47 with a high-frequency signal which, in effect, serves to measure the capacity, and hence the distance, between the probe and objects beneath it. Such capacity-probe measuring apparatus is well known in the art and available commercially, and hence need not be described in detail. A wiper blade 47A is preferably positioned ahead of the capacity-probe unit to wipe off any excessive peaks of soup which may rise above the can top if the soup is very thick.

Mounted on the same support 42 at the same general position along the conveyor as the level-sensing capacity probe unit 44, but at the side of the conveyor 32, is a proximity sensor 48, which may be of a conventional electro-magnetic type which produces an output signal over electrical cable 49 which is of relatively low strength between successive cans, which increases with the approach of any given can to a maximum when the can is directly opposite the proximity sensor, and then decreases again to a low value. Accordingly the positioning of each can immediately below the capacity probe 46 occurs at a time when the output signal of the proximity sensor has risen to a predetermined relatively high value. The output of the proximity sensor at this instant is utilized to control sampling of the output signal of the level-sensing capacity probe at the time when the center of each can is directly below the probe, thereby selecting samples of the capacity-probe output signal which are produced by the top level of the soup rather than by the can itself or by the portion of the conveyor belt which is exposed between the cans.

The broad overall arrangement of electromechanical system utilized in accordance with one preferred embodiment of the invention is illustrated in FIGURE 4, which again shows diagrammatically the cans 10 moving along on the conveyor 32 after leaving the filler arrangement, together with the fill-level control shaft 16, the level-sensing capacity probe unit 44, and the proximity sensor 48.

Capacity probe unit 44 is connected to capacity probe supply and sensing circuit 50, which again may be a conventional commercial unit for operating the capacity probe and deriving level-indicating signals therefrom. Typically it may include a source of high-frequency signals which are supplied to the capacity probe, and appropriate rectifying and amplifying circuits for producing a direct output voltage which varies in accordance with the spacing between the capacity probe and the nearest object beneath it. Commonly such circuits also include, either in a physical position immediately adjacent the capacity probe or in a separate unit, a balancing capacitor which may be supplied with the same high-frequency signal as is the capacity probe and which is connected to a common load in an opposing relationship with respect to the capacity probe; the balancing capacitor may be adjustable so as to cancel out any preselected level of capacity-probe output signal and hence may serve as a zero-reference adjustment. However, since adjustment of the balancing capacitor is often physically inconvenient, it is preferred to provide a similar function by means of an adjustable set-point bias supply 52 which adds a controllable bias of either desired polarity to the output of capacity probe supply and sensing circuit 50, at summing point 54.

FIGURE 6A illustrates a typical signal from summing point 54, ordinates representing voltage with respect to the zero-voltage line 0, and abscissae representing time, as a typical can passes beneath the capacity probe 46. Regions A, A' of the curve represent the low level of output produced between cans, the regions B, B' represent peaks of output produced when opposite edges of the can are directly beneath the probe, and region C represents the intermediate level of output voltage which is produced when the capacity probe is directly over the center of the can so as to respond primarily to the level of the soup in the can. The solid-line curve illustrates the case in which the region C of the curve is substantially at zero value, while the dotted curves in the region C illustrate two different cases in which the adjustment of the circuitry has been left the same but the level of the soup in the can is different. Thus the dotted curve above the line 0 represents a case in which the level to which the can has been filled with soup is higher, while the dotted curve below the line 0 corresponds to a case in which the soup level is lower. It is seen that the voltage at the output of summing point 54 during the interval C is zero for a predetermined level of soup and increasingly positive or negative when the soup level rises above or falls below this predetermined level, respectively. By manual adjustment of the adjustable set-point bias supply 52 the zero line marked "0" can be effectively raised or lowered so as to produce zero output for higher or lower levels of the soup; for example, it could be raised to coincide with the upper dotted curve in the region C, in which event no net output would be produced during C for the corresponding higher level of soup.

The signal of the form shown in FIGURE 6A is then passed through an amplifier 56 to an electrically-controlled sampling switch 58. The latter switch is normally open so that signals are prevented from passing through it to the integrating memory 60. However, during the intervals such as C shown in FIGURE 6A, the sampling switch 58 is momentarily closed in response to a control pulse generated by proximity sensor 48, amplifier and relay circuit 61 and timing circuit 62. As will be described more fully with reference to the detailed circuitry shown in FIGURES 5A and 5B, the proximity sensor 48 itself produces a relatively-wide, rising and then falling, output signal such as is represented in FIGURE 6B, as each can passes it. Preferably the proximity sensor is offset slightly downstream with respect to the capacity probe so that the output of the proximity sensor is rising during the time corresponding to the region C of the output from the capacity probe, as shown. The amplifier and relay circuit 61 not only provides gain and operates a relay in response to input signals, but also contributes a threshold function such that the relay therein is operated only after the input signal shown in FIGURE 6B has risen to a predetermined level $L_1$. As a result the latter relay is operated throughout the time of the pulse D in FIGURE 6C beginning at the time $t_1$ when the signal of FIGURE 6B reaches the $L_1$. Timing circuit 62 responds to the relay-closing represented in D of FIGURE 6C to produce the narrower pulse shown at E of FIGURE 6C, which starts at time $t_1$ and decays to a low level shortly thereafter. The latter narrow pulse is applied to another relay coil used to operate the sampling switch from the time $t_1$ to the time $t_2$ at which the pulse falls to the relay-dropout level $L_2$, as shown in FIGURE 6D. The electrically-controlled sampling switch 58 therefore closes from $t_1$ to $t_2$ and supplies only the portion C of the signal of amplifier 56 to integrating member 60, i.e. the signal portion accurately representing the soup level.

The input to integrating memory 60 therefore consists of one pulse in each interval $t_1$–$t_2$ for each can, which pulse is of zero amplitude if the soup in that can is at a predetermined level corresponding to the zero reference line 0 in FIGURE 6A, and is positive or negative if the soup level is above or below this reference level, respectively. The integrating memory 60 effectively combines and stores a substantial number of such successive input pulses so that an output DC voltage is produced which at any time has a value dependent on the average value of a large number of preceding input pulses, the most recent pulse having a substantial effect on the output voltage, but being prevented by the inertia of the integrating memory circuit 60 from changing the output voltage drastically. Accordingly the integrating memory output does not vary appreciably in response to random fluctuations in headspace, but does vary in response to a series of cans having soup levels which are consistently in error in the same sense.

The output of integrating memory 60 is passed through summing point 62 to a summing amplifier 64 and thence by way of power amplifier 66 to servo motor 68. The servo motor 68 is mechanically linked to fill-level control shaft 16, the polarity of the signals in the resultant electrical and mechanical servo loop being such that electrical signals produced by increases in soup level above a desired predetermined level cause the fill-level control shaft to operate in a direction to lower the cam ring 25 and to fill subsequent cans to a slightly lower level, and vice versa, thereby to correct recurrent errors in headspace.

Considering then the overall operation of the arrangement of FIGURE 4, with the adjustable set-point bias supply initially adjusted to produce the desired headspace in the cans, passage of the cans beneath the level sensor 46 will initially produce substantially zero amplitude of input pulses to integrating memory 60; the servo motor 68 will not be operated and the fill-level control shaft 16 will remain stationary. Should there be minor inconsistent can-to-can variations in headspace due to unavoidable minor irregularities in the system, or a single anomolous error in headspace of large amount, the resultant sampled pulses will not produce any substantial change in the output of the integrating memory 60 and the fill-level control shaft will not be operated. However, should a continuing consistent error in headspace occur for any reason, integrating memory 60 will be supplied with a series of pulses of the same polarity indicative of this error, each of which will have little effect on the output voltage but which together over a period of time will change the integrating memory output voltage to operate the servo motor 68 in a sense such as to correct the filling of subsequent cans in the proper direction, after which the servo motor will stop.

If desired in order to provide a highly-stable mechanical servo system, two negative feedback paths of known conventional type may be provided from servo motor 68 to summing point 62. One of these may include a tachometer generator 70 mechanically linked to, and driven by, servo motor 68, which generator produces an electrical output signal proportional to the speed of operation of the servo motor. The latter signal may be passed through a damping adjustment circuit 74 and combined subtractively with the output of integrating memory 60 at summing point 62. The other negative feedback path may comprise a mechanical coupling from servo motor 68 to follower potentiometer 76, the output of which is also subtractively combined with the output of integrating memory 60. These negative feedback circuits provide stability for the mechanical servo system, preventing wide overshoot, excessive hunting and uncontrolled oscillation in the system, in a manner well-known in the servo art.

Figure 5A:
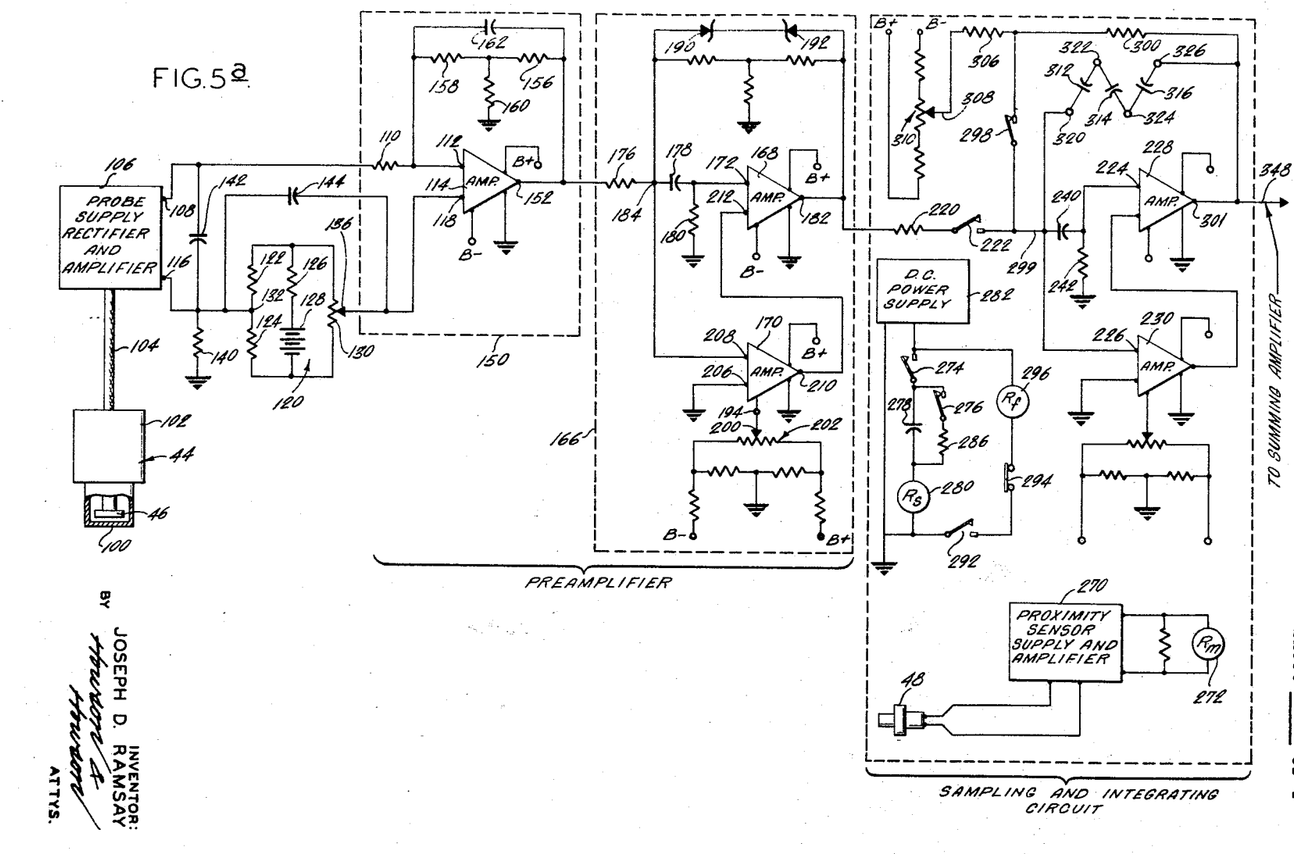
FIGURES 5A and 5B comprise a detailed electrical schematic diagram of a preferred embodiment of the invention.
Figure 5B:
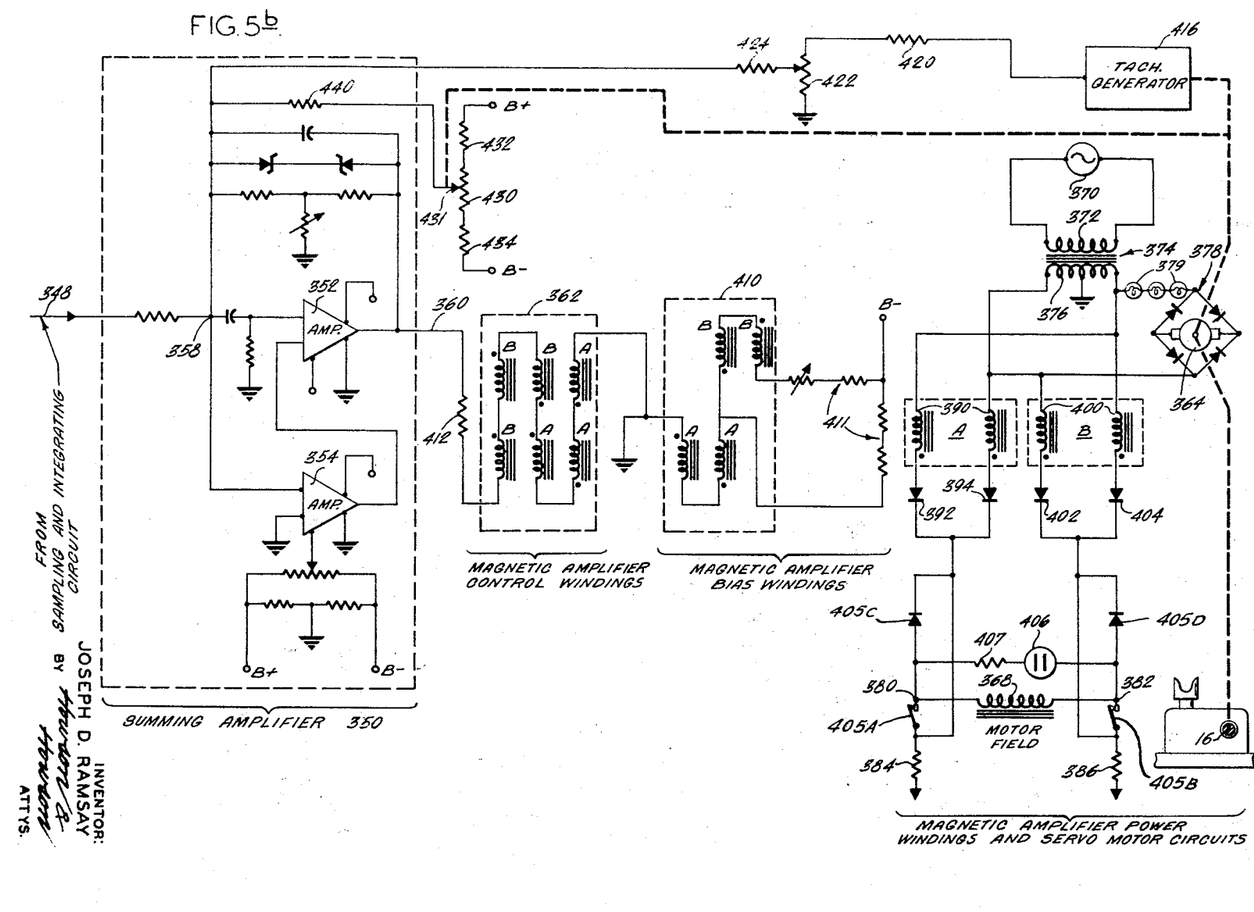

Referring now to FIGURES 5A and 5B which show, by way of example only, one preferred specific embodiment of the invention useful for controlling the headspace in soup-filled topless cans moving in a train at high speeds along a conveyor, the level-sensing capacity probe unit 44 and probe 46, the electromagnetic proximity sensor 48 and the mechanical fill-level control shaft 16 are shown without regard to their actual physical position, which has been shown and explained with respect to the previous figures. Probe 46 is shown encased in a protective plastic cover 100 and mounted from the probe case 102, which may contain the usual balancing capacitor as mentioned above. The probe and balancing capacitor are electrically connected by way of shielded cable 104 to the probe supply, rectifier and amplifier unit 106, which contains an appropriate high-frequency supply for operating the probe and appropriate rectifying and amplifying circuits to produce at its output terminals a varying DC voltage, such as is shown in FIGURE 6A, as the filled cans pass beneath it on the conveyor belt. The latter DC voltage can be of either polarity, depending on the soup level. Suitable forms for the probe, casing, cable and probe supply, rectifier and amplifier are well known and commercially available.

The upper output terminal 108 of probe supply, rectifier and amplifier 106 is supplied by way of series resistor 110 to the upper input terminal 112 of amplifying device 114. The lower output terminal 116 of probe supply, rectifier and amplifier 106 is supplied to the lower input terminal 118 of amplifying device 114 by way of a controllable biasing circuit 120, which serves as a manual control for the headspace. More particularly, the controllable biasing circuit 120 comprises a pair of series-connected resistors 122 and 124, in parallel with the series combination of a resistor 126 and a fixed voltage source 128, and also in parallel with a variably-tapped resistor 130. Output terminal 116 is connected to the junction point 132 between resistors 122 and 124, and the lower input terminal 118 of amplifying device 114 is connected to the variable tap 136 of resistor 130. Accordingly, by variation of the position of tap 136 either a positive or negative bias voltage of adjustable magnitude can be added to the output voltage at terminal 116 prior to its application to amplifier input terminal 118. The control provided by tap 136 can therefore be used in the manner described previously to adjust the voltage applied between input terminals 112 and 118 of amplifying device 114 to zero value for any desired level of the food material in the cans. A ground return resistor 140, and electrical noise suppressing capacitors 142 and 144 may also be provided across the output of probe supply, rectifier and amplifier 106 and across the bias supply circuit 120, respectively.

The elements in the dotted block 150 comprise a commercially-available form of differential operational DC amplifier. The active gain-producing element of the amplifier is the amplifying device 114, which is provided with appropriate supply voltages B+, B— and ground. The amplifying device 114, which may be of the vacuum-tube type, has the polarity characteristic that signals applied to the upper input terminal 112 thereof appear at the output terminal 152 thereof in reversed polarity, while those applied to input terminal 118 appear in amplified form at output terminal 152 without phase reversal. A resistive degenerative feedback connection, comprising the series resistors 156 and 158 having their common point connected to ground through a resistor 160, is connected from the output to the input of amplifying device 114 as shown, the amplifying device having a high input impedance so that its gain varies substantially in proportion to the ratio of the effective series feedback resistance to the resistance of series input resistor 110. The value of the shunt resistor 160 in the feedback path serves to adjust the effective series feedback resistance and is selected to provide the desired gain. The capacitor 162 in parallel with the resistive feedback path again serves to suppress electrical noise, and is of small enough value to avoid any appreciable integrating effect. In the present instance the operational amplifier 150 serves as a differential amplifier to produce at its output terminal 152 a voltage proportional to the difference between the voltages at its input terminals 112 and 118.

The elements in dotted block 166 comprise a stabilized operational amplifier of known commercially-available form employing a pair of amplifying devices 168 and 170 each of which may be similar to amplifying device 114. The upper amplifying device 168 is supplied with operating supply potentials B+, B— and ground, and further is supplied at its upper input terminal 172 with signal variations from the output of amplifying device 114, by way of an input series resistor 176 and a coupling capacitor 178. An appropriate shunt input resistor 180 is also connected from input terminal 172 to ground. The output terminal 182 of amplifying device 168 is connected back to the junction point 184 between resistor 176 and capacitor 178 in the same manner and for the same purposes as described wtih respect to amplifying stage 150, a pair of back-to-back Zener diodes 190 and 192 also preferably being provided in shunt with the resistive feedback path to limit the maximum difference between input and output voltage to a predetermined value.

Amplifying device 170 also is provided with B+ and ground supply potentials, the negative supply terminal 194 being supplied with a voltage variable between B+ and B— by connection to a variable tap 200 of a potentiometer-type arrangement 202 which is center-tapped to ground and supplied at opposite ends with the supply voltages B+ and B—. The lower input terminal 206 of amplifying device 170 is connected to ground and the upper input terminal 208 of this amplifying device is directly connected to the above-mentioned junction point 184. The output terminal 210 of amplifying device 170 is direct-coupled to the lower input terminal 212 of amplifying device 168. The signal from junction point 184 supplied by direct-coupling to input terminal 208 of amplifying device 170 therefore appears at output terminal 210 in reversed phase, but passes through amplifying device 168 to output terminal 182 without further phase reversal, so that the signal component which it produces at output terminal 182 at junction point 184 combines in additive phase with the signal component produced at the same output terminal 182 in response to signals from junction point 184 which pass by way of capacitor 178 to amplifier 168.

Amplifying stages 150 and 166 together constitute a DC preamplifier with built-in stabilization.

The resultant output signals from amplifying device 168 are supplied by way of input series resistor 220 and relay contacts 222 to the respective upper input terminals 224 and 226 of amplifying devices 228 and 230, the signals so-supplied to amplifying device 230 being direct-coupled thereto while those so-supplied to amplifying device 228 are first passed through the blocking capacitor 240, an appropriate shunt input resistor 242 also being provided between input terminal 224 and ground.

It will be understood that signals are so-supplied to the amplifying devices 228 and 230 only when the relay contacts 222 are closed, and since the latter relay contacts are normally open as shown the output signals of the previous amplifying device 168 are normally prevented from reaching amplifying devices 228 and 230. In accordance with one feature of the invention, it is arranged that the relay contacts 222 be closed only for the brief intervals C shown in FIGURE 6A, occurring when the cans are centered beneath the level-sensing probe 46. This provides the desired sampling of the amplified level-sensor output signal at the times when it is accurately representative of the true level of the food product in the cans, as explained hereinbefore.

In order to accomplish this sampling, the proximity sensor 48 is operated by connecting it to a proximity sensor supply and amplifier unit 270. The sensor 48 produces an output which is low between cans and rises as each can approaches a position opposite the sensor, reaching a peak when the can is directly centered in front of the sensor, as indicated by the graph of FIGURE 6B. The proximity sensor supply and amplifier 270 amplifies the sensor output signal when the latter signal reaches the threshold level $L_1$ shown in FIGURE 6B, and passes current through the relay coil 272 to operate it during the interval D of FIGURE 6C, the threashold level $L_1$ and the position along the can conveyor of sensor 48 being such that the relay-operating time D begins at the beginning of the interval C of FIGURE 6A. Relay 272 has two sets of contacts 274 and 276, the former set being normally open and the latter set normally closed. Relay contacts 274 are connected in series with a capacitor 278 and another relay coil 280 across the output of a DC power supply 282. Relay contacts 276 are connected in series with a resistor 286 across capacitor 278. Accordingly, whenever relay coil 272 is deactuated the charge on capacitor 278 is rapidly dissipated by way of closed contacts 276 and resistor 286. When relay 272 is actuated, contacts 276 open to remove this shunt path and contacts 274 close to apply the output of DC power supply 282 across the series combination of capacitor 278 and relay coil 280. This produces an initial large charging current for capacitor 278 which also flows through relay coil 280, this current, however, thereafter decreasing exponentially as the capacitor approaches its fully-charged condition. The current through relay coil 280 is therefore of the general form shown in dotted line in FIGURE 6C. This current is sufficient to actuate the contacts 222 associated with relay coil 280, until it drops below the dropout level $L_2$ in FIGURE 6C, at which time the latter relay coil is again deactuated. Accordingly relay coil 280 is actuated only during the time of the relatively narrow pulse shown in FIGURE 6D. The duration of the latter pulse can be adjusted by selection of the value of capacitor 278, larger capacitors producing longer pulses, a typical pulse duration being of the order of a few milliseconds. Relay coil 280, when actuated, momentarily closes contacts 222 to provide the above-described sampling of the signal from the level sensor. Accordingly the just-described arrangement operates as a timing circuit for responding to actuation of the relay coil 272 to operate the sampling relay contacts 222 for the desired brief interval during which the level sensor output signal accurately represents the level of the material in the cans.

Connected in shunt with the timing circuit is the series combination of a pair of normally-open filler-motor interlock contacts 292, a normally-closed manually-operable switch 294, and a relay coil 296 which operates normally-closed contacts 298. Contacts 292 are closed in response to operation of the motor which drives the can filler mechanism 12 of FIGURE 1 (filler motor and interlock mechanism not shown). Accordingly when the filler is operating a current passes through relay coil 296 from DC power supply 282, causing contacts 298 to open. When the filler stops operating, current through relay coil 296 stops and relay contacts 298 close to connect the input line 299 for amplifier 230 to an initial condition circuit to be described hereinafter. Switch 294 can be manually opened to cause the initial condition circuit to be connected to amplifier 230 for test and adjustment purposes, even though the filler motor is operating.

Returning now to the integrating arrangement to which the sampled level-indicating signals are supplied, it will be seen that this includes a circuit arrangement in which amplifying devices 228 and 230 are connected like the amplifying devices 168 and 170, respectively, with the exception that the arrangement of the feedback circuit for amplifying device 228 is different. More particularly, one terminal of a feedback resistor 300 is permanently connected to the output terminal 301 of amplifying device 228, the other terminal of resistor 300 is connected to the line 299 on the input side of amplifying device 228 only when relay contacts 298 remain closed. In addition, said other terminal of resistor 300 is connected by way of another resistor 306 to the variable tap 308 on a voltage divider 310 connected between B+ and B−, the latter resistors and variable voltage divider constituting an initial-condition adjustment circuit. A capacitance is also provided between the output of amplifying device 228 and input line 299; in this example the capacitance is provided by three capacitors 312, 314 and 316 of low-leakage characteristics, shown as connected in series but provided with jumper plugs 320, 322, 324 and 326 at their terminals so that by connecting a jumper between different pairs of these plugs one can also provide the capacitance of only one of the capacitors, of two of them in series, or of three of them in parallel, for example. It will be understood that in any given application a single capacitor without jumper plugs may be utilized, the arrangement in FIGURE 5A merely providing a convenient way to change the capacitors and hence the inertia or time constant of the integrator.

In the operation of the integrating circuit, when the filler motor is not running the interlock contacts 292 are open, relay coil 296 is deactuated and its contacts 298 closed, so that input line 299 is provided with a voltage determined by the adjustment of tap 308. Tap 308 is preferably adjusted under these conditions so that the output voltage of amplifier 228 is about zero. With the filler motor running and switch 294 closed, each sampling pulse closes contacts 222 momentarily during the intervals C in which the level sensor produces signals representative of departures from a predetermined desired level of the material in the cans, and the output voltage of amplifier 228 tends to assume the value which it would assume in response to these input sample pulses in the absence of the capacitors 312–316. However, because the electrical inertia provided by the capacitors produces a charging time constant comparable to the time required for a number of successive sample pulses (e.g. 20) and hence long compared with the duration of each sampling pulse, the output voltage is modified by each sample pulse only to a relatively small extent. After each sample pulse the contacts 222 reopen and the charge previously placed on the capacitors is held with very little loss until the next sampling pulse occurs. Accordingly, successive sample pulses of small amplitude or of randomly opposite polarities have little if any effect on the output voltage; such pulses will be produced, for example, in response to unavoidable insignificant random variations in the level of the soup in the cans. However, should there be a consistent continuing trend in departures of the soup level from a desired value in a particular direction, the cumulative effects of the resultant large number of successive sample pulses of the same polarity will produce a cumulative step-wise charging of the feedback capacitors and will after the output voltage of amplifier 228 by an amount sufficient to produce the desired change in the position of the fill-level control 16 to correct for such consistent errors in soup level, by way of the further automatic control equipment now to be described.

The output of amplifying device 228 is supplied by way of line 348 to the summing amplifier 350 of FIGURE 5B, which employs a pair of amplifying devices 352 and 354 connected in a circuit which may be substantially identical with the amplifying stage provided by amplifying devices 168 and 170 and described hereinbefore, with the exception that the junction point 358 at the input side of amplifying devices 352 and 354 is preferably supplied with two additional feedback signals in a manner and for a purpose to be described in more detail hereinafter. The summing amplifier therefore not only provides additional amplification to operate the following motor-control circuits but also provides a convenient circuit in which to accomplish this desired combination of signals.

The resultant output from amplifying device 352 is supplied over line 360 to the magnetic amplifier control windings 362 to control the direction and speed of rotation of the armature 364 of a reversible DC servo motor which operates the fill-level control shaft 16, the servo motor being controlled by the current through its field winding 368. This entire arrangement for controlling the servo motor may be conventional in form.

In the embodiment illustrated, an AC line source 370 supplies power to the primary 372 of a transformer 374 having a center-tapped secondary 376. Output from the secondary 376 is supplied to a bridge rectifier circuit 378 from which direct current is applied to armature 364 by way of three series-connected tungsten-filament bulbs 379 which serve as ballast elements to deliver a substantially constant current to the bridge rectifier, thereby to assure rapid response of the armature to field current changes. The current through the motor field 368 is determined by the difference in voltage between the connection points 380 and 382 at its opposite ends. The voltages at points 380 and 382 in turn is determined by the current through the respective resistors 384 and 386, the latter current being determined by a pair of saturable reactor devices A and B; saturable reactor device A contains the various windings designated A in FIGURE 5B, while saturable reactor device B contains the coils marked B in that figure.

The power windings 390 for saturable reactor device A have their upper terminals connected to opposite ends of the secondary 376 of transformer 374 and their lower ends connected through separate, similarly-poled diodes 392 and 394 to the upper terminal of resistor 384. Accordingly there is produced at point 380 a full-wave rectified positive voltage the magnitude of which depends upon the impedances of the power windings 390. Power windings 400 of saturable reactor device B are also connected to secondary 376 and by way of separate similarly-poled diodes 402 and 404 to the upper terminal of resistor 386, so that there is produced at point 382 a full-wave rectified positive voltage of a magnitude depending upon the impedance of the power windings of saturable reactor device B.

Accordingly, when the impedances of power windings 390 and 400 are equal there is zero voltage across the motor field 368, and different polarities and magnitudes of voltage are applied across the motor field when the impedances of the power windings 390 and 400 are caused to differ from each other in either sense.

Also preferably employed are a pair of limit switches 405A and 405B, which are normally closed. A different one of the limit switches opens for each extreme of rotation of the motor. This opens the circuit to the motor field and stops the motor. The motor remains in this extreme position until the polarity of voltage across it reverses. To permit the motor to resume operation after reaching one of its limiting positions, a pair of rectifiers 405C and 405D are employed in the position shown to provide a path for the current which drives the motor away from its limiting position; in the normal motor range in which the limit switches are closed, these rectifiers are short-circuited and do not interfere with the previously-described operation.

A gas-discharge tube 406 and series limiting resistor 407 are preferably connected across the motor field to absorb excessive voltages due to inductive kicks and the like.

The relative impedances of the power windings 390 and 400 are controlled by the control windings 362, appropriate magnetic biasing being supplied in the usual way by means of the bias windings 410 which are provided with biasing current from the B− supply by way of an adjustable resistive network 411. The dots adjacent the ends of the windings indicate their relative polarities. Accordingly the output voltage of amplifying device 352 supplied over line 360 by way of isolating resistor 412 to control windings 362 serves as a control voltage to control rotation of armature 364 so as to operate fill-level control 16 in either sense, depending upon the polarity of the control voltage on line 360, and to stop such operation when the control voltage is zero.

To provide improved stabilization for the motor control system, a tachometer generator 416 is preferably mechanically coupled to armature 364 and produces an electrical output which is fed back to junction point 358 at the input of summing amplifier 350. The latter feedback is by way of the resistor 420, the variably-tapped resistor 422 and a further series resistor 424 which together serve as a damping control by permitting manual adjustment of the amount of the tachometer generator feedback.

Preferably there is also provided a follower potentiometer arrangement comprising a variably-tapped resistor 430, the variable tap 431 of which is automatically moved by a mechanical linkage to different positions in response to rotation of motor armature 364, each different position of the tap corresponding to a different position of armature 364. Voltage is applied to variably-tapped resistor 430 from the supply source (B+ and B−) by a pair of resistors 432 and 434 in balanced positions on opposite sides of the variably-tapped resistor. The potential on the variable tap 431, which represents the position of armature 364, is supplied through an isolating resistor 440 to the junction point 358 in subtractive phase. The arrangement of follower potentiometer, tachometer generator and damping control circuit provides a stable yet quick servo response in accordance with known practices.

It will therefore be appreciated that the circuit arrangement of FIGURES 5A and 5B produces amplified signals at the output terminal 182 of amplifying device 168 which vary in accordance with the heights of objects moving along the conveyor carrying the product-filled cans, that the proximity sensor 48 causes relay contacts 222 to sample the latter signal at the time when each can is directly beneath the level sensor so as to derive sampled signals accurately representative of the height of the product in the cans, that the integrating memory circuit described above produces an output voltage which depends upon the net effects of a substantial number of the sampled pulses, and that the latter signal is applied to operate the servo motor and turn to fill level control shaft 16 only when repetitive sample pulses of the same polarity indicative of a consistent error in product level occur, the operation of the fill-level control shaft being in the direction to change the extent of filling of subsequent cans so that the consistent error in product level is substantially eliminated. In this way the headspace is maintained substantially constant despite long-term tendencies for the extent of filling to vary, without unnecessary and harmful "hunting" in response to random variations in headspace from can to can or in response to an occasional single can of grossly-improper headspace.

Referring now to FIGURES 7A, 7B and 7C, which are plotted to a common time scale along the horizontal axis but are not otherwise to scale either in amplitude or time, FIGURE 7A represents for illustrative purposes a sequence of signals from the level sensor which might be produced by eight successive cans. The dotted line 0 represents the voltage produced by a reference level of the object in the cans, such as that level for which the desired headspace is produced. The waveform $W_1$ produced by the first can of the series has, during the sampling interval C, the value of zero with respect to the line 0, the waveform $W_2$ due to the second can has a positive value during the interval C indicative of a higher soup level, while the waveform $W_3$ produced by the third can has a negative value during the interval C thereof. The other five waveforms $W_4$, $W_5$, $W_6$, $W_7$ and $W_8$ have substantial positive values during their respective intervals C all indicative of a higher soup level. FIGURE 7B represents the corresponding sample pulses derived from the level sensor output signals of FIGURE 7A, with respect to the 0 reference value. The pulses of FIGURE 7B therefore represent the input signals to the integrating memory unit 60 of FIGURE 4. FIGURE 7C represents the corresponding output signals of the integrating memory. During the interval C of the first waveform $W_1$, the integrating memory output signal does not change while during the interval C of the waveforms $W_2$ and $W_3$ it first changes only very slightly positive and then slightly negative, neither of the latter changes being substantial in practice and the net integrating memory output signal after the occurrence of waveform $W_3$ again being substantially zero. However, during each of the intervals C in each of the five succeeding waveforms $W_4$–$W_8$, the integrating memory output signal increases in small successive steps to a value which, after the last five waveforms are finished, is of appreciable value. These figures therefore illustrate the fact that any individual sampled level-indicating pulse cannot produce any substantial change in output of the integrating memory, and that where such pulses are random in nature, e.g. some positive and some negative, they tend to cancel each other in the output of the integrating memory; however, a series of successive sampled pulses of the same polarity will, when repeated sufficiently often, produce a substantial output signal from the integrating memory to operate the filler control shaft to correct the soup level in subsequent cans. It will be understood that, due to the closed-loop servo operation of the system, the errors in fill level represented by the pulse samples of FIGURE 7B and the integrating memory output voltage of FIGURE 7C are opposed and minimized by the resultant automatic operation of the fill level control shaft.

While the invention has been described with particular reference to specific embodiments thereof in the interest of complete definiteness, it will be understood that it may be embodied in a variety of diverse forms differing from those specifically shown without departing from the spirit and scope of the invention as defined by the appended claims.

I claim:
1. Apparatus for filling each of a sequential train of open-topped cans with a product and for maintaining the level of the top of said product substantially the same in all of said cans, comprising:
   filler means for filling said cans sequentially with said product, said filler means having control means operable to increase or decrease the extent of said filling;
   means for moving said filled cans continuously along a predetermined path in a rapidly-moving train;
   level-sensing means disposed over the path of travel of the centers of the open tops of said cans for producing a first electrical signal varying in accordance with the distance to the nearest object below it;
   proximity sensing means disposed alongside said path of said cans for producing a second electrical signal which rises to a predetermined value each time one of said cans is centered beneath said level sensing means;
   sampling means responsive to said second signal to sample said first signal each time said second signal rises to said predetermined value and for a short time during which said first signal accurately represents the level of said product in one of said cans;
   an integrating memory circuit supplied with said sampled first signal for producing a control signal having a varying strength which at any given time is determined by the value of a plurality of preceding samples of said first signal; and
   servo motor means supplied with said second control signal of varying strength for operating said control means in a manner to correct the extent of filling of subsequent cans in said train when said level of said product exhibits a consistent departure of the top surface of said product from a desired level thereof;
   said level-sensing means comprising a capacitive transducer having a capacity-sensing element disposed above the path of said cans for producing voltages which vary in accordance with the capacitance between said capacity-sensing element and the top surface of objects passing beneath said capacity-sensing element.

2. The apparatus of claim 1, comprising negative feedback means responsive to motion of said servo motor means for combining with said control signal, at a point in said apparatus following said memory circuit, a negative feedback signal for stabilizing the operation of said apparatus.

3. The apparatus of claim 2, wherein said negative feedback means comprises a follower potentiometer operated by said servo motor means.

4. Apparatus in accordance with claim 3, wherein said negative feedback means comprises a tachometer generator operated by said servo motor means for developing a negative feedback signal proportional to the rate of change of position of said servo motor means.

References Cited

UNITED STATES PATENTS

| 2,961,013 | 11/1960 | Johnson | 141—146 X |
| 3,309,511 | 3/1967 | Begeman et al. | 330—108 X |
| 3,364,940 | 1/1968 | Ginsburgh et al. | 141—231 X |
| 3,368,593 | 2/1968 | Mamas | 141—95 X |
| 2,645,447 | 7/1953 | Clark et al. | 141—196 X |
| 2,852,937 | 9/1958 | Maze. | |
| 3,011,036 | 11/1961 | La Rocca. | |
| 3,062,994 | 11/1962 | Mesh. | |
| 3,225,191 | 12/1965 | Calhoun. | |

FOREIGN PATENTS 939,830  10/1963  Great Britain.

LAVERNE D. GEIGER, *Primary Examiner.*

E. J. EARLS, *Assistant Examiner.*

U.S. Cl. X.R.

141—153, 196